United States Patent Office 3,345,370
Patented Oct. 3, 1967

3,345,370
4-(N-MONO-SUBSTITUTED)HYDRAZONES OF 4-DEDIMETHYLAMINO-4-OXO-TETRACYCLINE
Robert Carlyle Esse, Pearl River, N.Y., and George Sieger, Montvale, N.J., assignors to American Cyanamid Company, Stamford, Conn., a corporation of Maine
No Drawing. Filed Mar. 16, 1965, Ser. No. 440,305
18 Claims. (Cl. 260—247.2)

ABSTRACT OF THE DISCLOSURE

This disclosure describes compounds of the class of substituted 4-dedimethylamino-4-oxo-tetracycline-4-(lower alkyl)-hydrazones useful as antibacterial and anti-fungal agents.

This invention relates to new organic compounds and, more particularly, is concerned with novel 4-dedimethylamino-4-oxo-tetracycline-4-(lower alkyl)-hydrazones and with methods of preparing these novel compounds. The novel 4-dedimethylamino-4-oxo-tetracycline-4-(lower alkyl)-hydrazones of the present invention may be represented by the following general formula:

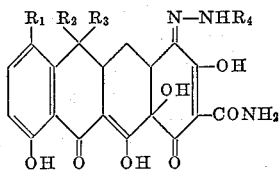

wherein $R_1$ is hydrogen, chlorine or bromine; $R_2$ is hydrogen or methyl; $R_3$ is hydrogen or hydroxy; and $R_4$ is lower alkyl. Suitable lower alkyl groups contemplated by the present invention are those having from 1 to 4 carbon atoms. The novel compounds of the present invention are well defined crystalline materials having characteristic ultraviolet absorption spectrum. They may be conveniently purified either by crystallization from a suitable solvent or by partition-column chromatography.

The 6-hydroxy series of the novel compounds of the present invention may be readily prepared from an appropriately substituted tetracycloxide in accordance with the following reaction scheme:

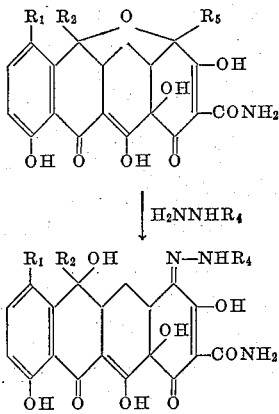

wherein $R_1$, $R_2$ and $R_4$ are as hereinabove defined and $R_5$ is hydroxy or dimethylamino. The reaction, where $R_5$ is dimethylamino, is conveniently carried out in refluxing methanol and after the reaction is complete the product may be obtained by standard procedures. In the above reaction scheme, where $R_5$ is hydroxy, then a tri(lower alkyl)amine should be employed as solvent.

The 6-deoxy series of the novel compounds of the present invention may be readily prepared from an appropriately substituted 4-dedimethylamino-4-oxo-6-deoxytetracycline in accordance with the following reaction scheme:

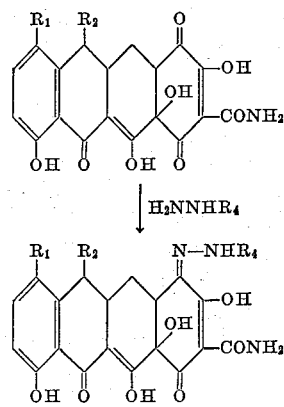

wherein $R_1$, $R_2$ and $R_4$ are as hereinabove defined. The reaction is conveniently carried out in refluxing methanol and after the reaction is complete, the product may be obtained by standard procedures.

The 4-hydroxytetracycloxides and 4-dimethylaminotetracycloxides, the starting materials for certain of the novel compounds of the present invention, may be readily prepared in good yield by treating an appropriately substituted tetracycline with an oxidizing agent. Suitable oxidizing agents are, for example, oxygen, electrophilic halogen (such as an alkali metal chlorate and hydrochloric acid), mercuric acetate or equivalent mercury salts, cupric acetate or equivalent copper salts, alkali metal periodates, potassium permanganate, alkali metal peroxides and ferric salts. The oxidation is conveniently carried out in a suitable solvent such as, for example, glacial acetic acid, methanol, dimethylformamide, methylcellosolve and the like, at temperatures ranging from −10° C. to 35° C. over a period of time of from as little as five minutes to eight hours or more. The production of the 4-dimethylaminotetracycloxides is favored under anhydrous conditions but the presence of significant amounts of water does not exclude the possibility of isolating some of the 4-dimethylaminotetracycloxides. When the oxidation is run under aqueous conditions, then the 4-hydroxytetracycloxides are obtained. The oxidation of 6-demethyltetracycline with mercuric acetate is illustrative of the differing conditions which lead to 4-hydroxytetracycloxide on the one hand and 4-dimethylaminotetracycloxide on the other. When 6-demethyltetracycline is oxidized with mercuric acetate in the various solvent systems set forth in Table I below, the product obtained in each case depends upon the water content of the solvent system as is also set forth in Table I below.

TABLE I

| Run No. | Solvent System | Product Obtained |
|---|---|---|
| 1 | Anhydrous dimethylformamide. | Predominantly 4-dimethylaminotetracycloxide. |
| 2 | Dimethylformamide plus 5% water. | Do. |
| 3 | Dimethylformamide plus 15% water. | A mixture of 4-dimethylaminotetracycloxide and 4-hydroxytetracycloxide. |
| 4 | Dimethylformamide plus 50% water. | Only 4-hydroxytetracycloxide. |

Although the solvent system of run No. 3 is not strongly acidic, it is probable that the 4-dimethylaminotetracycloxide in the product mixture would eventually convert to 4-hydroxytetracycloxide. However, after twenty-four hours at room temperature there was considerable 4-dimethylaminotetracycloxide still present.

After the oxidation is complete, the product may be obtained by standard procedures. In the case of the 4-dimethylaminotetracycloxides, it is most convenient to merely dilute the reaction mixture with a non-solvent, e.g. water at a neutral pH, which results in precipitation of the product. In the case of the 4-hydroxytetracycloxides, the product may also be precipitated upon dilution of the reaction mixture with a non-solvent, e.g. water at a somewhat acidic pH. The 4-hydroxytetracycloxides may then be purified by recrystallization from a methylcellosolve-0.1 N hydrochloric acid mixture.

The 4-dedimethylamino - 4 - oxo-6-deoxytetracyclines, the starting materials for certain of the novel compounds of the present invention, may be readily prepared in good yield by treating an appropriately substituted 6-deoxytetracycline with N-chlorosuccinimide in a suitable solvent such as, for example, 50% aqueous acetone, at temperatures ranging from —10° C. to 35° C. over a period of time of from as little as a few minutes to an hour or more. After the reaction is complete, the product may be obtained by standard procedures.

The novel compounds of the present invention are biologically active and have been found to possess antibacterial and antifungal activity. For example, the antibacterial spectrum of typical compounds of the present invention was determined in a standard manner by the agar dilution streak technique. The antibacterial spectrum of a compound relates to the amount required to inhibit the growth of various typical bacteria and is commonly used in testing new antibiotics. The minimal inhibitory concentration, expressed in micrograms per milliliter of typical compounds of the present invention against various organisms is shown in Table II below.

TABLE II

| Organism | (1) | (2) | (3) |
| --- | --- | --- | --- |
| Staphylococcus aureus ATCC 6538P | 62 | 125 | 15 |
| Staphylococcus albus No. 69 | | | 15 |
| Streptococcus faecalis ATCC 8043 | | 125 | 31 |
| Streptococcus pyogenes C 203 | | 125 | 31 |
| Streptococcus γ No. 11 | | | 31 |
| Streptococcus β No. 80 | | | 31 |
| Bacillus subtilis ATCC 6633 | 62 | 31 | 15 |
| Salmonella gallinarum 604 | | 125 | |
| Escherichia coli 22 | 125 | 62 | 31 |

(1) 4-dedimethylamino-4-oxo-6-demethyltetracycline-4-methylhydrazone.
(2) 4-dedimethylamino-4-oxo-6-demethyl-7-chlorotetracycline-4-methylhydrazone.
(3) 4-dedimethylamino-4-oxo-6-deoxytetracycline-4-methylhydrazone.

The antibacterial activity of the novel compounds of the present invention makes them useful as additives to materials which are subject to microbial deterioration such as cutting oils, jet fuels and diesel oils. They are also useful in soaps, shampoos, and topical compositions for the treatment of wounds and burns. The antifungal activity of the novel compounds of the present invention makes them useful as fungus inhibitors in leather tanning.

The novel compounds of the present invention may be readily converted to the more soluble Mannich derivatives which may be represented by the following general formula:

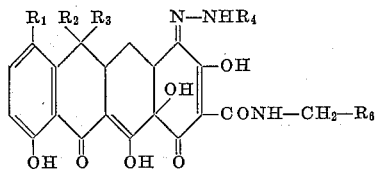

wherein $R_1$, $R_2$, $R_3$ and $R_4$ are as hereinabove defined and $R_6$ is a secondary amino moiety such as, for example, dimethylamino, diethylamino, piperidino, morpholino, pyrrolidino, N-methylpiperazino, etc. These Mannich derivatives are also included within the purview of the present invention and may be readily prepared by treating an appropriate 4-dedimethylamino-4-oxo-tetracycline-4-(lower alkyl)-hydrazone with formaldehyde and a secondary amine in an inert solvent such as methylcellosolve, at room temperature.

The invention will be described in greater detail in conjunction with the following specific examples.

EXAMPLE 1

4-hydroxytetracycloxide

In a solution of 800 ml. of methanol and 170 ml. of conc. hydrochloric acid was dissolved 86 g. of 6-demethyltetracycline. Then a solution of 8.6 g. of sodium chlorate in 40 ml. of water was added over a ten minute period. At the beginning of the addition, the temperature of the reaction mixture was 19.5° C., whereas at the end of the addition the temperature had risen to 25.5° C. Five minutes after the addition was complete the temperature of the reaction mixture had risen to 32° C. whereupon a heavy precipitate began forming. The reaction mixture was then stirred at room temperature for 10 minutes and then at ice bath temperature for one hour. The reaction mixture was then diluted with 200 ml. of water, the precipitate was removed by filtration and washed several times with water. The yield of vacuum-oven dried product was 50 g. The 4-hydroxytetracycloxide was recrystallized as follows: 1 g. was dissolved in 20 ml. of methylcellosolve and stirred with 200 mg. of Darco for 20 minutes, the Darco was removed by filtration, and the white crystalline product was precipitated by the addition of 4 volumes of 0.1 N hydrochloric acid.

EXAMPLE 2

4-hydroxytetracycloxide

In 30 ml. of glacial acetic acid was dissolved 4.3 g. of 6-demethyltetracycline and to this solution was added 1.5 g. of N-chlorosuccinimide over a period of 5 minutes. The resulting solution was stirred at room temperature for 30 minutes and then poured into 300 ml. of water. The precipitate which formed was removed by filtration and vacuum-oven dried. Recrystallization of the 4-hydroxytetracycloxide was effected in the same manner as in Example 1.

EXAMPLE 3

4-hydroxytetracycloxide

In 280 ml. of dimethylformamide was dissolved 10 g. of 6-demethyltetracycline and the resulting solution was exposed to air at room temperature for 10 days. Isolation was by evaporation of the solvent under reduced pressure followed by slurrying the dried residue in 250 ml. of 0.1 N hydrochloric acid, and collecting the insoluble material by filtration. This crude product, 4-hydroxytetracycloxide, was purified by recrystallization as in Example 1.

EXAMPLE 4

7-chloro-4-hydroxytetracycloxide

6 - demethyl - 7 - chlorotetracycline (46.5 g.) was dissolved in glacial acetic acid (300 ml.). Concentrated HCl (85 ml.) was added to this solution and the resulting solution was then cooled to just above freezing with an ice bath. To the cooled, stirred solution there was added dropwise, over a ten minute period, a solution of sodium chlorate (4.3 g.) in 20 ml. water. At the end of the addition period, the ice bath was removed and the reaction mixture was stirred an additional ten minutes and then poured into 3 liters of water. The precipitated reaction mixture was stirred at room temperature for two hours, then placed in a chill room (4° C.) overnight. The product was collected and dried. Yield: 33.3 g. An analytically pure sample was obtained as follows: The crude material (44 g.) was dissolved in 250 ml. of dimethylformamide and treated with Darco G–60 (10 g.). The solution was filtered and diluted with 1 liter of water giving a gummy precipitate. The gum was collected and retreated with Darco G–60 in dimethylformamide. Slow addition of two volumes of water gave a crystalline product. Repeating this procedure on the isolated crystals gave a sample (23 g.) which analyzed correctly for the product with one mole of crystallization of dimethylformamide.

EXAMPLE 5

*4-dimethylaminotetracycloxide*

6-demethyltetracycline (50 g.) was dissolved in dimethylformamide (400 ml.). To this solution was added mercuric acetate (36.9 g.). The mixture was stirred overnight at room temperature and then filtered. The filtrate was cooled to ice-bath temperature and then combined with three volumes of cold water. The precipitate was collected by filtration, washed well with cold water and dried. Yield: 42.8 g.

Similar results were obtained through the use of corresponding amounts of either cupric acetate or potassium periodate in place of mercuric acetate. In addition, simply bubbling oxygen (air) through a dimethylformamide solution of 6-demethyltetracycline gives the product. In the latter case a longer reaction time is required.

EXAMPLE 6

*7-chloro-4-dimethylaminotetracycloxide*

By replacing the 6-demethyltetracycline employed in Example 5 by an equimolecular quantity of 7-chloro-6-demethyltetracycline and following substantially the same procedure described in Example 5, there is obtained the 7-chloro-4-dimethylaminotetracycloxide.

EXAMPLE 7

*4-dedimethylamino-4-oxo-6-demethyltetracycline-4-methylhydrazone*

4 - dimethylaminotetracycloxide (8.56 g.) and methylhydrazine (4 ml.) were combined in methanol (400 ml.) and the mixture was refluxed on a steam bath for 20 minutes. The reaction solution was concentrated to dryness under reduced pressure and the residue was dissolved in water (200 ml.). The crude product was precipitated by adjusting the pH of the solution to 5.0 with 5 N HCl. The product was collected by filtration, washed with water and dried. Yield: 7.6 g. The product was suspended in a mixture of water (300 ml.) and dimethylformamide (90 ml.) and heated, with stirring, to 85° C. The solution was treated with Darco G 60 and filtered while hot. The filtrate was maintained at 4° C. for 24 hours after which the crystalline precipitate was collected, washed with water and dried. Yield: 4.1 g.

EXAMPLE 8

*4-dedimethylamino-4-oxo-7-chloro-6-demethyltetracycline-4-methylhydrazone*

7-chloro-4-dimethylaminotetracycloxide (4.63 g.) and methylhydrazine (2.0 ml.) were combined in methanol (200 ml.) and the solution was refluxed on a steam bath for 20 minutes. The reaction solution was concentrated to dryness under reduced pressure and the residue was dissolved in 200 ml. water. The pH of the solution was adjusted to 5.0 by the addition of 5 N HCl and the precipitated product was collected by filtration, washed with water and dried. Yield: 4.23 g. The amorphous product was dissolved in methylcellosolve (85 ml.) and heated, with stirring, to ca. 80° C. To this hot solution, there was added water (170 ml.) at such a rate that the temperature was maintained at around 80° C. At the completion of the addition of the water, crystallization began. The mixture was allowed to cool to room temperature as stirring was continued. After aging at room temperature for three hours, the crystals were collected, washed with water and dried. Yield: 2.45 g.

EXAMPLE 9

*4-dedimethylamino-4-oxo-6-deoxytetracycline-4-methylhydrazone*

4-dedimethylamino-4-oxo-6-deoxytetracycline (1.0 g.) and methylhydrazine (0.4 ml.) were combined in methanol (40 ml.) and the mixture was refluxed on a steam bath for 15 minutes. The reaction solution was concentrated to dryness under reduced pressure. The solid residue was dissolved in water (25 ml.) and the product was precipitated by adjusting the pH to 5.0 with 1 N HCl. The product was collected by filtration, washed with water and dried. Yield: 1.0 g.

EXAMPLE 10

*4-dedimethylamino-4-oxotetracycline-4-methylhydrazone*

Methylhydrazine (0.5 ml.) was combined with triethylamine (25 ml.). To this solution there was added 4-hydroxy-6-methyltetracycloxide (500 mg.) with good stirring. There was an immediate precipitation of a yellow gum. The mixture was agitated for 10 minutes and the nearly water-white liquid was decanted from the gummy product. The product was dissolved in water (25 ml.) and the solution was adjusted to pH 5.0 by the addition of 5 N HCl. The resulting precipitate was collected, washed with water and dried. Yield: 450 mg.

EXAMPLE 11

*4-dedimethylamino-4-oxo-6-deoxytetracycline*

6-deoxytetracycline hydrochloride (4.65 g.) was slurried in 20 ml. of 50% aqueous actone. To this slurry was added a solution of N-chlorosuccinimide (1.402 g.) in 20 ml. of acetone. The mixture was stirred for one hour at room temperature. The crystalline product which formed was collected by filtration, washed with 0.1 N HCl and dried. Yield: 2.7 g.

EXAMPLE 12

*4-dedimethylamino-4-oxo-6-demethyltetracycline-4-ethylhydrazone*

4-dimethylaminotetracycloxide (3.44 g.) was added to a solution of ethylhydrazine ·$H_2SO_4$ (2.52 g.) and triethylamine (4.48 ml.) in methanol (150 ml.). The mixture was refluxed on a steam bath for 15 minutes, and then concentrated to dryness under reduced pressure. The residue was combined with water (100 ml.) and sufficient 1 N HCl to give a pH value of 5.0. The product was collected by filtration and dried. Yield: 3.6 g.

EXAMPLE 13

*4-dedimethylamino-4-oxo-7-chloro-6-demethyltetracycline-4-ethylhydrazone*

This compound was made just as in Example 12 cited above, but substituting 7-chloro-4-dimethylaminotetracycloxide (3.7 g.) for 4-dimethylaminotetracycloxide.

EXAMPLE 14

*2-carboxamido - N - (morpholinomethyl) - 4 - dedimethylamino-4-oxo-6-demethyltetracycline-4-methylhydrazone*

To 732 mg. of 4-dedimethylamino-4-oxo-6-demethyltetracycline-4-methylhydrazone in 12 ml. of methylcellosolve was added 0.4 ml. of 37% aqueous formaldehyde and 0.4 ml. of morpholine. The solution obtained was stirred at room temperature for one hour. Skellysolve B was added to the solution, and a colored oil formed. The Skellysolve B was decanted, and the oil, after drying in vacuo, was precipitated by addition of anhydrous ether to yield 590 mg. (67%) of a yellow solid.

What is claimed is:

1. A compound of the formula:

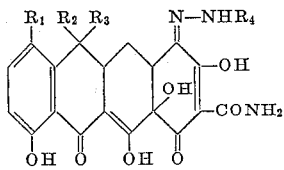

wherein $R_1$ is selected from the group consisting of hydrogen, chlorine and bromine; $R_2$ is selected from the group consisting of hydrogen and methyl; $R_3$ is selected from the group consisting of hydrogen and hydroxy; and $R_4$ is lower alkyl.

2. 4-dedimethylamino - 4 - oxo-tetracycline-4-methylhydrazone.
3. 4-dedimethylamino - 4 - oxo-7-chlorotetracycline-4-methylhydrazone.
4. 4-dedimethylamino - 4 - oxo - 7-bromotetracycline-4-ethylhydrazone.
5. 4-dedimethylamino-4 - oxo - 6 - deoxytetracycline-4-methylhydrazone.
6. 4-dedimethylamino-4-oxo-7-chloro - 6 - deoxytetracycline-4-ethylhydrazone.
7. 4-dedimethylamino - 4 - oxo - 7-bromo-6-deoxytetracycline-4-n-propylhydrazone.
8. 4-dedimethylamino-4-oxo - 6-demethyltetracycline-4-methylhydrazone.
9. 4-dedimethylamino-4-oxo-7-chloro - 6-demethyltetracycline-4-methylhydrazone.
10. 4-dedimethylamino-4-oxo-6-demethyltetracycline-4-ethylhydrazone.
11. 4-dedimethylamino-4-oxo-7-chloro-6-demethyltetracycline-4-ethylhydrazone.
12. 4-dedimethylamino-4-oxo-7-bromo-6-demethyltetracycline-4-isopropylhydrazone.

13. A compound of the formula:

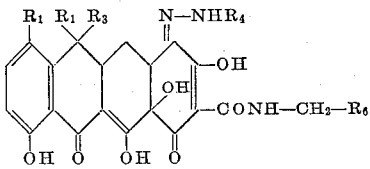

wherein $R_1$ is selected from the group consisting of hydrogen, chlorine and bromine; $R_2$ is selected from the group consisting of hydrogen and methyl; $R_3$ is selected from the group consisting of hydrogen and hydroxy; $R_4$ is lower alkyl; and $R_6$ is a secondary amino moiety.

14. 2-carboxamido-N-(morpholinomethyl)-4-dedimethylamino - 4-oxo-6-demethyltetracycline - 4 - methylhydrazone.
15. 2-carboxamido - N - (pyrrolidinomethyl) - 4-dedimethylamino-4-oxo-7-chloro - 6 - demethyltetracycline-4-ethylhydrazone.
16. 2-carboxamido-N-(dimethylaminomethyl)-4 - dedimethylamino - 4 - oxo - 6 - deoxytetracycline-4-isopropylhydrazone.
17. 2-carboxamido - N - (piperidinomethyl) - 4 - dedimethylamino-4-oxo - 7 - bromo - 6-deoxytetracycline-4-n-butylhydrazone.
18. 2-carboxamido - N - (diethylaminomethyl)-4-dedimethylamino - 4 - oxo-tetracycline-4-methylhydrazone.

References Cited

UNITED STATES PATENTS 3,159,675  12/1964  Esse et al. _____ 260—559

NICHOLAS S. RIZZO, *Primary Examiner.*

UNITED STATES PATENT OFFICE
CERTIFICATE OF CORRECTION

Patent No. 3,345,370　　　　　　　　　　　　　　　October 3, 1967

Robert Carlyle Esse et al.

It is hereby certified that error appears in the above numbered patent requiring correction and that the said Letters Patent should read as corrected below.

Column 8, lines 4 to 10, the formula should appear as shown below instead of as in the patent:

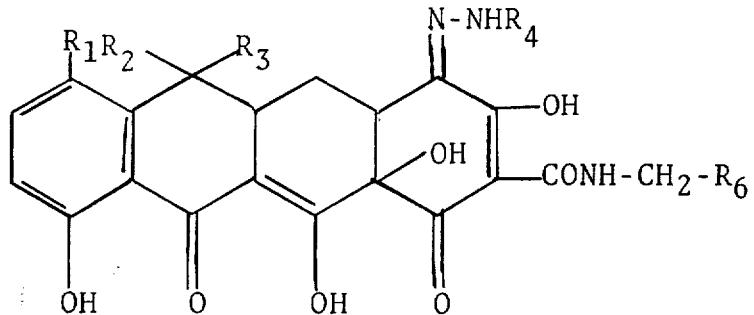

Signed and sealed this 19th day of November 1968.

(SEAL)
Attest:

EDWARD M. FLETCHER, JR.　　　　　　　　　　EDWARD J. BRENNER
Attesting Officer　　　　　　　　　　　　　Commissioner of Patents